United States Patent [19]

Bosatelli

[11] Patent Number: 5,708,551
[45] Date of Patent: Jan. 13, 1998

[54] ELECTRICAL DISTRIBUTION DEVICE WITH PREVENTIVE CHECKING OF THE STATE OF THE LOAD, PARTICULARLY FOR CIVIL AND INDUSTRIAL USERS

[75] Inventor: Domenico Bosatelli, Cenate Sotto, Italy

[73] Assignee: Gewiss S.p.A., Cenate Sotto, Italy

[21] Appl. No.: 606,659

[22] Filed: Feb. 26, 1996

Related U.S. Application Data

[63] Continuation of Ser. No. 82,700, Jun. 28, 1993, abandoned.

[30] Foreign Application Priority Data

| Jul. 14, 1992 | [IT] | Italy | MI92A1707 |
| Apr. 23, 1993 | [IT] | Italy | MI93A0809 |
| Apr. 23, 1993 | [IT] | Italy | MI93A0810 |
| Apr. 23, 1993 | [IT] | Italy | MI93A0811 |

[51] Int. Cl.$^6$ .................... H02H 3/00
[52] U.S. Cl. ................ 361/62; 307/38
[58] Field of Search ............ 361/1, 62; 307/38, 307/85, 86; 324/133

[56] References Cited

U.S. PATENT DOCUMENTS

| 4,370,562 | 1/1983 | Palazzetti et al. | 307/38 |
| 4,825,150 | 4/1989 | Sirasud | 324/133 |
| 5,270,576 | 12/1993 | Kahle | 307/38 |

FOREIGN PATENT DOCUMENTS

| 2147425 | 3/1972 | Germany. |
| 2411344 | 10/1975 | Germany. |
| 234210 | 3/1986 | Germany. |
| 2123226 | 1/1984 | United Kingdom. |
| 8602500 | 4/1986 | WIPO. |
| 8911747 | 11/1989 | WIPO. |

*Primary Examiner*—Jeffrey A. Gaffin
*Assistant Examiner*—Sally C. Medley
*Attorney, Agent, or Firm*—Guido Modiano; Albert Josif

[57] ABSTRACT

An electrical distribution device with preventive checking of the state of the load, particularly for civil and industrial users, having a plurality of electrical tapping outlets which are mutually connected by a single-phase/multiple-phase electrical distribution line and at least one electrical connector for data transmission which is connected to elements for controlling the device. Each outlet is provided with elements for detecting plugs within the respective receptacles; these elements indicate the presence or absence of the plugs to elements for connecting the outlet to the electrical distribution line; each outlet is also provided with elements for detecting phase/neutral polarity and elements for detecting the state of the load. The connecting elements selectively close normally-open coupling elements between the electrical distribution line.

47 Claims, 5 Drawing Sheets

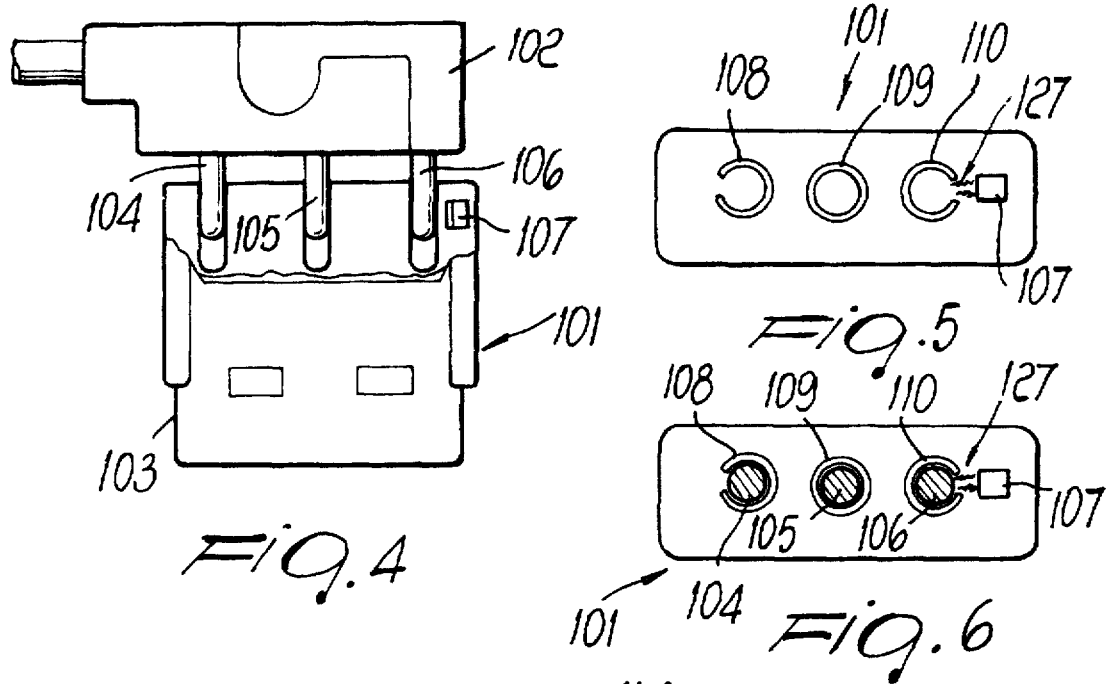
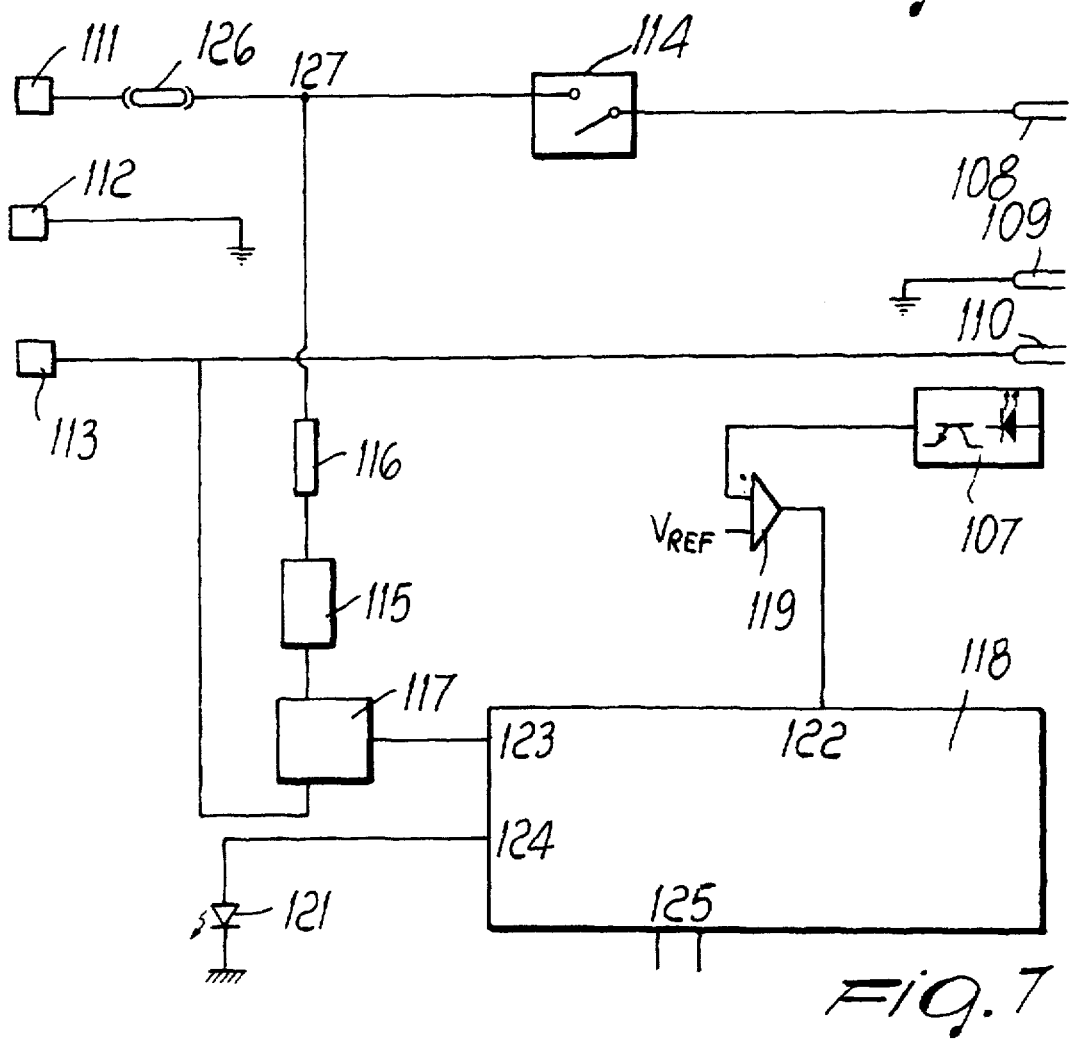

5,708,551

1

ELECTRICAL DISTRIBUTION DEVICE WITH PREVENTIVE CHECKING OF THE STATE OF THE LOAD, PARTICULARLY FOR CIVIL AND INDUSTRIAL USERS

This is a continuation application of application Ser. No. 08/082,700 filed on Jun. 28, 1993, now abandoned.

BACKGROUND OF THE INVENTION

The present invention relates to an electrical distribution device with preventive checking of the state of the load, particularly for civil and industrial users.

As is known, civil or industrial electrical distribution systems use various safety devices to avoid accidents and especially in the case of civil systems to prevent accidents involving children.

Differential protection devices, used in civil systems, and safety and control systems in industrial systems are known, but it is evident to any expert in the field that the true reason for danger is the presence of voltages on the outlets distributed throughout the system.

For complete safety, it would therefore be necessary to be able to disconnect the voltage from the outlets when these outlets are not used by loads of any kind.

A solution often used in industry is to preset a safety switch which can usually be actuated manually and can supply power to the outlet to which it is connected only when it is closed.

These solutions, although sufficiently widespread, do not however provide for the above mentioned safety, since in the case of safety switches these switches can be left closed.

SUMMARY OF THE INVENTION

The aim of the present invention is to eliminate the drawbacks described above by providing an electrical distribution device with preventive checking of the state of the load, particularly for civil and industrial users, which eliminates the use of safety switches or of fuses for protecting the users of the device.

Within the scope of the above aim, an object of the present invention is to provide a device which recognizes the presence of a plug inserted in an outlet without incurring in hazards caused by the false recognition of objects inserted in the outlet.

Another object of the present invention is to provide a device which indicates the correct phase/neutral connection of plugs inserted in power outlets.

Another object of the present invention is to provide a device which detects the state of the load both before and after the load has been supplied with power.

Another object of the present invention is to provide a device which is sensitive to any variation of the load connected to an outlet of the device and accordingly ensures the supply of power only within preset limits.

Another object of the present invention is to provide a device which is highly reliable, relatively easy to manufacture and at competitive costs.

BRIEF DESCRIPTION OF THE DRAWINGS

Further characteristics and advantages of the electrical distribution device according to the present invention will become apparent from the following description of a preferred but not exclusive embodiment thereof, illustrated only by way of non-limitative example in the accompanying drawings, wherein:

FIG. 4 is a schematic front view of an individual outlet, according to a further embodiment of the device according to the present invention;

FIG. 5 is a plan view of the outlet of FIG. 4 of the device according to the present invention, with no plug inserted;

FIG. 6 is a plan view of the outlet of FIG. 4 of the device according to the present invention, with the plug inserted;

FIG. 7 is an electrical diagram of the outlet of FIG. 4 of the device according to the present invention;

DESCRIPTION OF THE PREFERRED EMBODIMENTS

Figure 1:
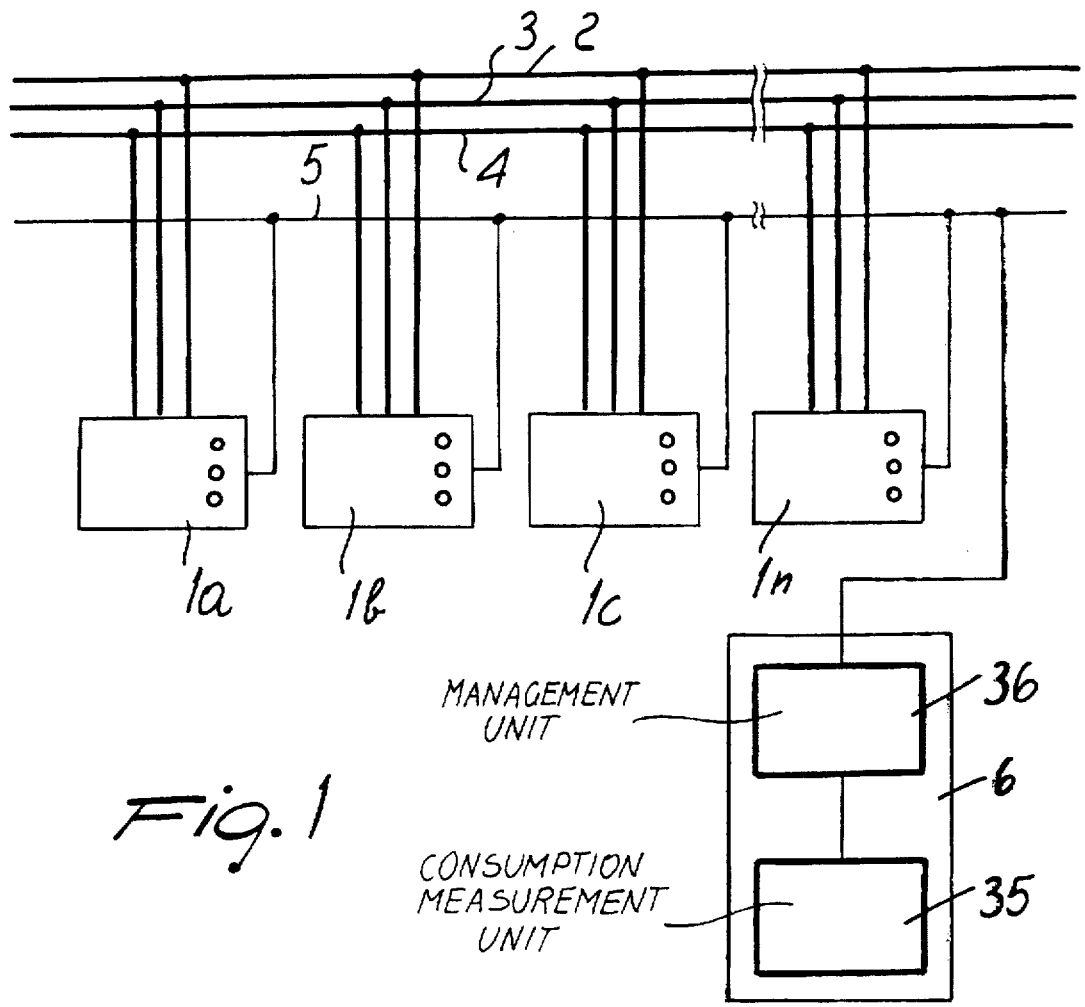
FIG. 1 is a block diagram of the device according to the present invention.
Figure 2:
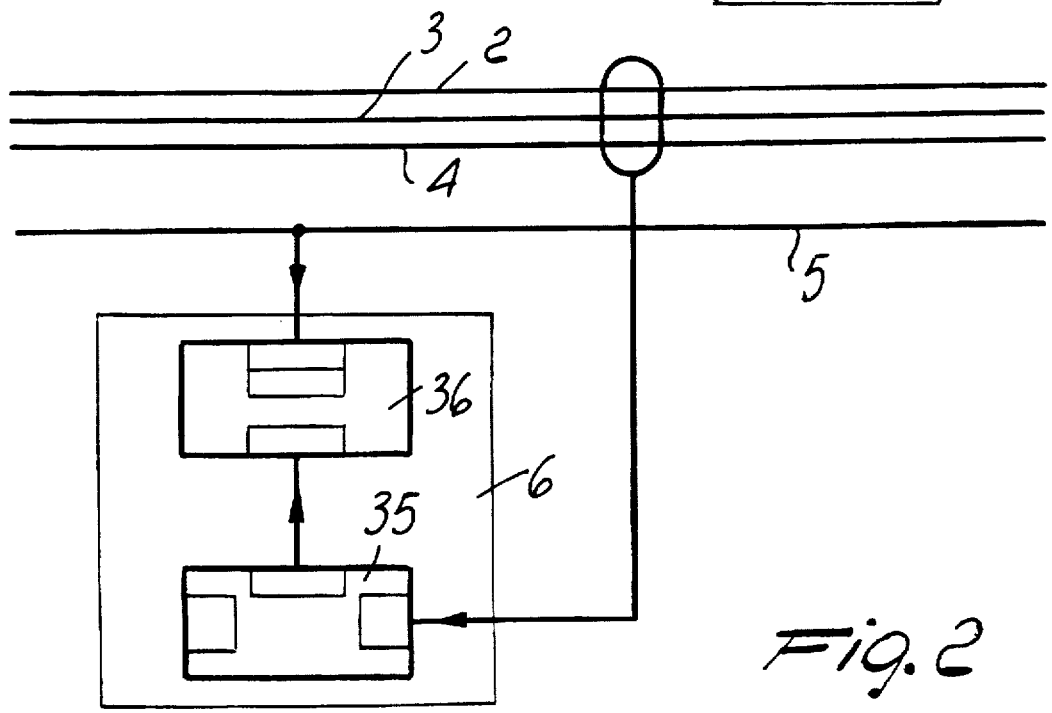
FIG. 2 is a block diagram of the control means of the device according to the present invention.
Figure 3:
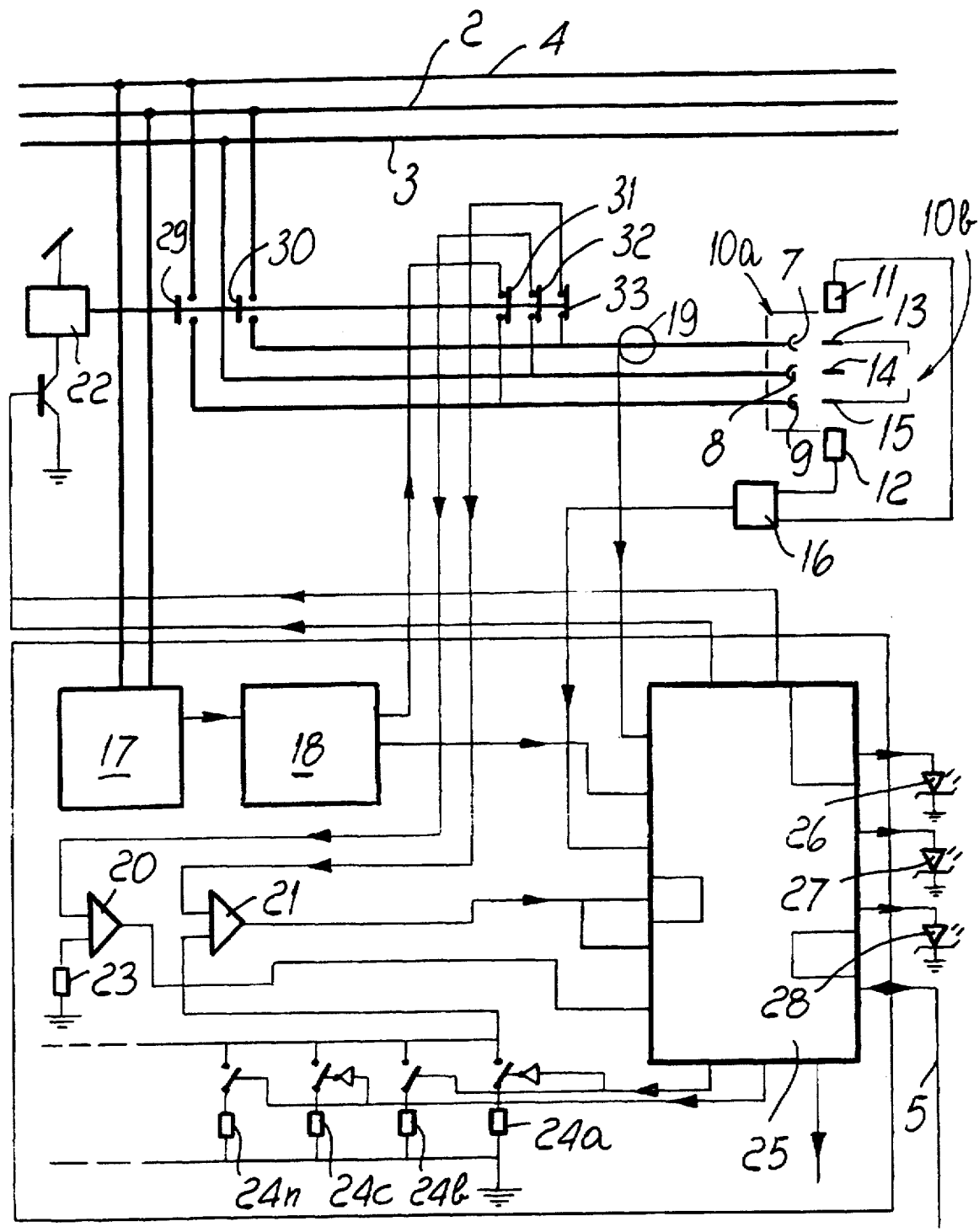
FIG. 3 is a block diagram of an individual outlet according to the present invention.

With reference to FIGS. 1 to 3, an electrical distribution device with preventive checking of the state of the load, particularly for civil and industrial users, comprises a plurality of outlets, designated by the reference numerals 1a to 1n in the figure, for drawing electric power; said outlets are mutually connected by a single-/multiple-phase electrical distribution line, which in the single-phase embodiment shown has a neutral 2, a ground 3 and a phase 4, and by at least one electrical data transmission connector 5 which is connected to control means, designated by the reference numeral 6, of the device according to the invention.

Each outlet 1i is provided with means for detecting the presence of plugs, i.e. of a load, within the respective receptacles 7, 8 and 9; said means indicate the presence or absence of said plugs to means for connecting the outlet to the electrical distribution line.

The connecting means close the normally-open coupling means which are located between said distribution line and said outlet.

The detection means comprise a photodiode 11 which emits an electromagnetic radiation in the visible, infrared or ultraviolet spectrum, depending on the particular requirements of the system; this radiation can be detected by an optical receiver 12 when the receptacles 7, 8 and 9 are empty, and can be blocked by pins 13, 14 and 15 of the plug 10b inserted in the outlet.

The optical receiver 12 emits a signal, indicating that the electromagnetic radiation has ceased due to the presence of the plug 10b inserted in the outlet, through a controller 16, which controls and supplies power both to the optical receiver 12 and to the photodiode 11.

The connection means comprise a power supply 17 which is connected to the phase 4 and to the neutral 2 and powers a pulse generator 18; the pulses have a preset frequency which is much higher than the frequency of the electrical voltage/current supplied by the power supply line; the generator sends to the receptacle 9 a high-frequency pulsed low voltage or a train of high-frequency pulses to detect the type of load connected to the outlet 10a.

A Hall-effect detection probe 19, which is arranged on the receptacle 7 which can be connected to the neutral 2, detects the current and thus the type of load and reports it to a local control unit 25. The inputs of this control unit are the signal sent by the optical receiver 12, a load characterization signal from the Hall-effect probe 19, and control signals related to local voltage references, as better explained hereinafter, from a pair of comparators 20 and 21 the inputs of which are connected respectively to the receptacles 8 and 7 of the outlet and to the internal references.

The local control unit 25, in addition to being connected to the electrical connector 5 by interacting with the control means 6, controls an actuator 22 which activates the coupling means.

The above mentioned references comprise a ground reference 23a across a resistor 23 for the first comparator 20, which is connected to the ground receptacle 8; said references further comprise a series of voltage divider stages 24a/24n which are connected to an output of the local control unit 25 and divide an appropriate reference signal for the second comparator 21, whose other input is connected to the neutral receptacle 7.

The local control unit 25 furthermore powers a group of LEDs 26, 27 and 28 which indicate the status of the individual i-th outlet.

The coupling means comprise first switches 29 and 30, which are normally open, for connecting the phase 4 and the neutral 2 of the distribution line to the respective receptacles 9 and 7, and second switches 31, 32 and 33, which are normally closed, for connecting the pulse generator to receptacle 9 and for connecting the comparators 20 and 21 to the receptacles 7 and 8. The first switches 29 and 30 and the second switches 31, 32 and 33 are closed or open in a mutually exclusive manner, since the first switches connect the outlet to the mains and the second ones connect the outlet to the local control unit 25.

The control means 6 comprise a consumption measurement unit 35 and a management unit 36 for the plurality of outlets. The management unit 36 selects the powering of the essential loads in the case of excessive consumption detected by the consumption measurement unit 35.

The device according to the invention has two operating modes: local and global. The local operating mode is related to the individual i-th outlet, whereas global operation includes the local operation with supervision, performed by the control means 6.

Local operation entails that the receptacles 7, 8 and 9 are normally disconnected from the mains 2, 3 and 4, i.e. the outlet is not powered when there is no load, of any kind, connected to it. If a load, detected by the insertion of the plug 10 in the receptacles 7, 8 and 9 and checked by the optical receiver 12, is connected, then the local control unit 25 checks, by means of the comparators 20 and 21 and the probe 19, the type of load connected, whether it is purely dissipative or not. If there are no short circuits in the load, it connects the receptacles 7 and 9 to the mains 2 and 4 by means of the first switches 29 and 30.

The global operation, which includes the local operation, entails the checking of the system consumption and intervenes only if global consumption exceeds the nominal consumption. In this case, the measurement unit 35, which has its own analog/digital converters, its own internal power references and a communication bus, sends an excessive consumption signal when the system consumption is lower, by a preset value, than the maximum allowable consumption of the system. In this case, the management unit 36, by accessing its memory, opens the first switches 29 and 30 in the outlets to which loads considered non-essential are connected, leaving the essential loads powered, i.e. leaving the first switches 29 and 30 closed in the outlets to which these essential loads are connected. The memory of the management unit 36 stores a table of the essential loads, i.e. a map of the outlets to which these loads are connected. The commands of the management unit 36 are sent to the outlets 1a–n by means of the transmission bus or conductor 5 with one of the well-known serial transmission methods.

FIGS. 4 to 7 illustrate a further embodiment of an individual outlet with the plug detection means.

With reference to FIG. 4, the numeral 101 designates the individual outlet of the device according to the present invention. The numeral 102 designates the plug inserted in the power outlet 103. The plug 102 comprises a phase pin 104, a ground pin 105 and a neutral pin 106. The pins 104, 105 and 106 of the plug are normally made of metal and have a polished surface.

With reference to FIGS. 5 and 6, the numeral 108 designates the receptacle in which the phase pin 104 is inserted; the numeral 109 designates the receptacle in which the ground pin 105 is inserted; and the numeral 110 designates the third receptacle, in which the neutral pin 106 is inserted. Next to the neutral receptacle 110 there is a reflective infrared sensor 107 which is essentially constituted by an element which transmits infrared light and by an element which receives reflected light.

The neutral receptacle 110 is provided with an opening 127 which is directed towards the sensor 107. The width of the opening 127 is such as to allow the passage of the infrared ray emitted by the sensor 107 toward the inside of the neutral receptacle 110.

With reference to FIG. 7, the numerals 111, 112 and 113 respectively designate the phase, ground and neutral terminals for connection to the electric mains. The receptacles of the outlet are now designated by the reference numerals 108, 109 and 110 respectively.

A switch 114, controlled by the relay 115, is interposed between the phase terminal 111 and the phase receptacle 108, and allows for the connection and the disconnection of the power supply to the phase receptacle 108. The switch may also be a semiconductor-based electronic switch (triac, silicon-controlled rectifier or SCR, thyristor).

The switch 114 is activated by the relay 115 and by a relay controller 117. The controller 117 and the relay 115 are powered by the terminals 111 and 113 (phase and neutral). A resistor is furthermore arranged in series with the relay 115 and to the controller 117 for adjusting the power supply current.

The relay controller 117 is connected, by means of the input 123, to the control means constituted by a control unit 118, which is preferably microprocessor-based.

The output of the reflective infrared sensor 107 is connected to one of the inputs of a comparator 119. The other input of the comparator 119 is connected to a reference voltage $V_{REF}$. The output of the comparator 119 is connected to the control unit 118 by means of the input 122.

A LED indicator 121 is connected to the control unit 118.

The control unit 118 is furthermore provided with an output 125 for connections to other control units.

Finally, a protection fuse 126 for the relay pin is interposed between the phase terminal 111 and the node 127.

The operation of this further embodiment of the outlet according to the present invention is as follows.

When a plug is inserted in the outlet and the neutral pin 106 is inserted in the neutral receptacle 110, the light-transmitting element of the sensor 107 emits infrared rays towards the pin 106. These rays are reflected by the surface of the pin and are detected by the reflected-light receiver element of the sensor 107. The reflected-light receiver element can be constituted by either a phototransistor, photodiode, photoresistor or another light sensor.

The sensor 107 generates a voltage signal which is compared with the reference voltage $V_{REF}$ by means of comparator 119. The reference voltage $V_{REF}$ can be calibrated according to the output characteristics of the sensor 107. Furthermore, the reference voltage can be set to avoid the false recognition of a plug, when, for example, the receptacle of the outlet is narrower than normal, and the infrared rays are reflected by the internal wall of the receptacle and are detected by the reflected-light receiver element. Furthermore, the pins of plugs are usually polished and allow for good reflection. Nevertheless, the plugs may be more opaque, according to norms of some countries, allowing less reflection of the infrared rays.

Accordingly, the reference voltage $V_{REF}$ is calibrated to activate the comparator 119 when a plug is inserted in the outlet, and said comparator generates a plug recognition signal. This recognition signal is sent to the control unit 118, which activates the relay controller 117, by means of the output 123. Accordingly, the relay controller activates the switch 114 by means of the relay 115, which connects the phase receptacle 108 to the phase terminal 111, supplying power to the outlet.

Similarly, when the plug is removed, there is no recognition signal, and the control unit deactivates the controller, which deactivates the relay, opening the switch 114.

The relay 115 and the controller are powered by the phase terminal 111, across the node 127, and the fuse 126 protects the relay against possible mains overloads.

The control unit signals the correct insertion of the plug in the outlet by activating a LED 121.

The control unit, which is provided with an I/O port 125, call be connected to other control units if it is desirable to control a plurality of outlets in the same building.

It should be stressed that the reflective infrared sensor 107 can be arranged adjacent to any one of the receptacles 108, 109 or 110. However, it is more convenient to arrange the sensor next to the neutral receptacle 110 for safety reasons, as explained hereinafter.

If, for example, a person or an unattended child inserts an object similar to the pin of the plug, such as a nail, in the neutral receptacle 110, and this object is recognized as being a pin, the outlet is powered without entailing any danger, since the neutral receptacle is at the same potential as the ground voltage or very close to it. If the object is inserted in the other receptacles, the outlet is not powered.

Figure 8:
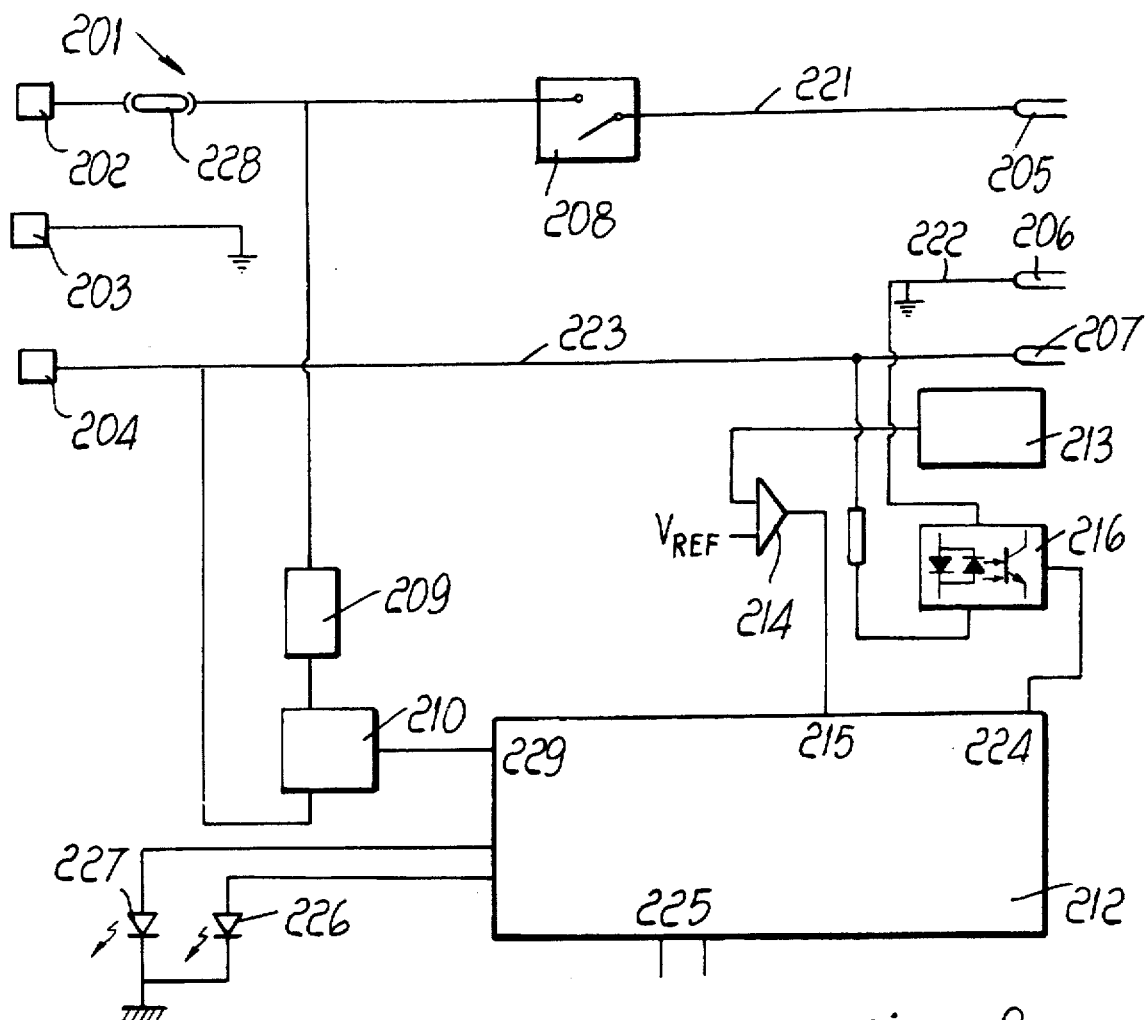
FIG. 8 is an electrical diagram of another embodiment of an individual outlet according to the present invention.
Figure 10:
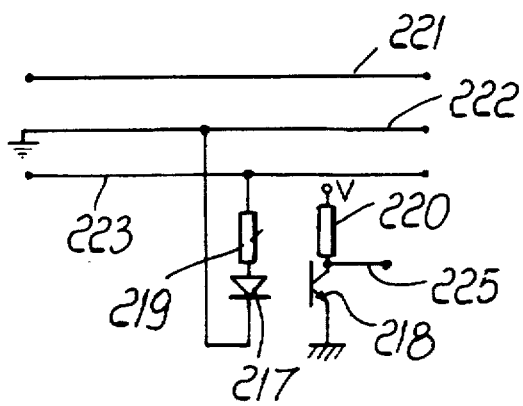
FIG. 10 is an electrical diagram of the outlet polarity detection means of the outlet of FIG. 8, with the correct power supply.
Figure 9:
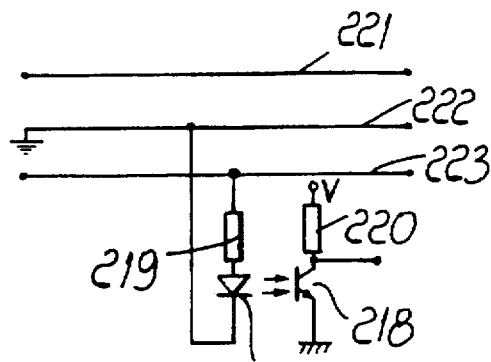
FIG. 9 is an electrical diagram of the outlet polarity detection means of the outlet of FIG. 8, with an incorrect power supply.

FIGS. 8, 9 and 10 illustrate a further embodiment of an individual outlet of the device according to the present invention, which comprises outlet polarity detection means.

With reference to FIG. 8, the numeral 201 designates the device according to the present invention. The numerals 202, 203 and 204 designate the phase, ground and neutral mains connection terminals. The phase, ground and neutral receptacles of the outlet are designated by the reference numerals 205, 206 and 207 respectively.

A switch 208 is interposed between the phase terminal 202 and the phase receptacle 205 on the line 221 and is controlled by a relay 209 which interrupts or connects the supply of power to the phase receptacle 205. A line 223 connects the neutral terminal 204 to the neutral receptacle 207.

The switch 208 is activated by the relay 209 and by a relay controller 210. The controller 210 and the relay 209 are powered by the terminals 202 and 204 (phase and neutral). Furthermore, a resistor 211 is arranged in series with respect to the relay 209 and to the controller 210 in order to adjust the power supply current.

The relay controller 210 is connected, by means of the output 229, to control means constituted by a control unit 212, which is used for the detection of the correct-connection signal and for the signalling of this connection; said control unit is preferably a microprocessor.

The relay 209 and the controller 210 are connected in series and are interposed between the phase terminal 202 and the neutral terminal 204, which supply the power to the relay and to the controller.

Furthermore, the relay, the controller and other components of the device may be powered by a low-voltage supply drawn from a transformer connected to the power supply terminals. This alternating voltage can be rectified by means of known rectifiers.

A reflective infrared sensor 213 is arranged next to the neutral receptacle 207, and is essentially constituted by an infrared-light transmitter element and by a reflected-light receiver element, similarly to the previous embodiment.

The output of the reflective infrared sensor is connected to one of the inputs of a comparator 214. The other input of the comparator 214 is connected to a reference voltage $V_{REF}$. The output of the comparator 214 is connected to the control unit 212 by means of an input 215.

Outlet polarity detection means 216 are connected to the line of the phase receptacle 205 and to the line of the ground receptacle 206. The detection means 216 are furthermore connected to the control unit 212 by means of an input 224.

As shown in FIGS. 9 and 10, the detection means are constituted by a light-emitting diode 217 and by a light sensor 218, advantageously a phototransistor. The anode of the diode 217 is connected by means of a first resistor 219 to the line 223, which is interposed between the mains neutral terminal 204 and the neutral receptacle 207. The cathode, on the other hand, is connected to ground, advantageously to the line 222 of the ground receptacle 206. The line 221 connects the mains phase terminal 202 to the phase receptacle 205. The phototransistor 218 is powered by a voltage V having a value sufficient to activate said phototransistor.

The light sensor 218 can be constituted by a photoelectric detector of any kind, such as for example a photodiode, a photoresistor, a photo-switch, etc. Likewise, the diode 217 may be replaced with any electronic light-emitting device. The first resistor 219 is connected in series with the diode 217 and a second resistor 220 is connected in series with the phototransistor 218, in order to regulate the current of the two components.

The control unit 212 is provided with an output 225 for connections to other control units.

Furthermore, two light-emitting diodes 226 and 227 are connected to the control unit 212: one is for indicating the presence of the plug within the outlet, and the second one is for indicating the correct polarity of the outlet.

Finally, a protection fuse 228 for the relay is arranged on the line 221.

The operation of this further embodiment of the outlet according to the present invention is as follows.

Similarly to the previous embodiment, the detection of the presence of a plug inserted in the outlet occurs when the sensor 213 detects the presence of the neutral pin in the neutral receptacle 207. Subsequently, the sensor 213 sends a signal to the control unit 212 by means of the comparator 214. The control unit 212 sends a plug recognition signal to the relay controller 210, which activates the relay which consequently activates the switch 208, supplying power to the phase receptacle 205. Insertion of the plug is indicated by means of the first diode 226.

If the terminals 202 and 204 for connection to the mains are connected in an inverted manner, i.e. if the phase terminal is supplied with the neutral voltage and the neutral terminal is supplied with the phase voltage, the outlet is not powered correctly. More specifically, the phase receptacle 205 is not supplied with the neutral voltage and the neutral receptacle 207 is supplied with the phase voltage; this entails dangers if an object similar to the pin of the plug is inserted in said neutral receptacle, which would not be the case if the terminals 202 and 204 were connected correctly, as has been explained previously.

Therefore, before detecting the presence of the plug inserted in the outlet it is necessary to check the correct phase/neutral connection of the outlet.

FIG. 9 illustrates the case in which the connection terminals are connected to the mains in an inverted manner.

The mains supply phase voltage is present on the line 223, on which the neutral voltage is normally present; this voltage is sufficient to drive the diode 217, which is connected to the line with its anode. The line 221 is at the neutral voltage. Even if there is an alternating voltage on the line 223, the positive half-periods of the mains voltage can drive the diode 217, which emits periodic signals. These light signals are detected by the light sensor 218, which sends incorrect-connection signals to the control unit 212. If the light sensor is constituted by a phototransistor, the incorrect-connection signals can be obtained from the collector contact 229 of the phototransistor. These signals can then be converted into signals suitable to be detected by the control unit 212. In this case, the control unit 212 does not make the first LED 227 flash. The lack of the light signal emitted by the diode is interpreted as an incorrect connection of the outlet. The phototransistor is powered by a low-voltage power supply or by the low-voltage power drawn from the transformer. The activation of the diode 217 and of the phototransistor 218 is calibrated by the resistors 219 and 220 respectively.

FIG. 10 illustrates the case in which the connection terminals are correctly connected to the mains.

The mains supply neutral voltage is present on the line 223 and is equal to the ground voltage or very close to it. The line 221 is at the phase voltage. If the neutral voltage is not equal to the ground voltage, activation of the diode 217 is calibrated not to drive the diode when there is a neutral voltage. If the neutral voltage is equal to the ground voltage, the diode cannot be driven. Since the diode 217, in this case, does not emit a signal, this signal is not detected by the phototransistor and consequently no incorrect-connection signal is sent to the control unit 212, which makes the first LED 227 flash, indicating the correct connection of the outlet.

The diode 217 could be interposed between the phase line 221 and the neutral line 223, if the diode 217 has an inverse bias higher than the mains voltage.

The device according to the present invention allows the further advantage of detecting the polarity of the plug without interfering with the circuit of the power supply connections, since the emitter and the light sensor are physically separated from each other.

Figure 11:
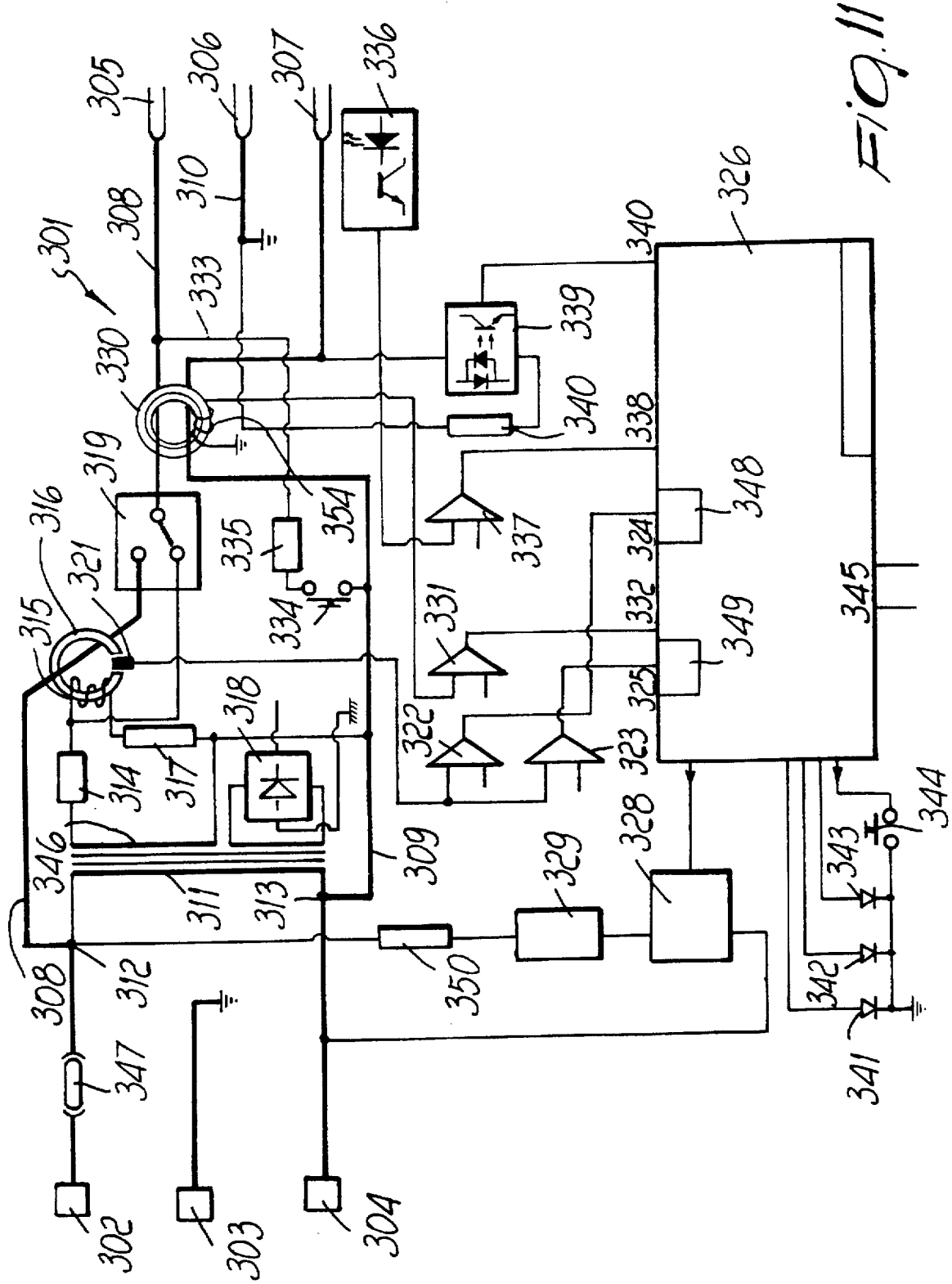
FIG. 11 is an electrical diagram of an individual outlet of a further embodiment of the device according to the present invention.

FIGS. 11 illustrates yet another embodiment of an individual outlet of the device according to the present invention, which comprises means for checking the status of the load.

With reference to FIG. 11, the numeral 301 designates the device according to the present invention. The phase, ground and neutral power supply terminals, which are connected to the mains, are designated by the reference numerals 302, 303 and 304 respectively. The phase, ground and neutral receptacles of the outlet are respectively designated by the reference numerals 305, 306 and 307. The power supply line that connects the phase terminal 302 to the phase receptacle 305 is designated by the reference numeral 308, whereas the line that connects the neutral terminal 304 to the phase receptacle 307 is designated by the reference numeral 309. The ground line, which is connected to the ground receptacle, is designated by the reference numeral 310.

A transformer 311, provided with a primary winding, a first secondary winding 346 and a second secondary winding, has one end of its primary winding connected to the phase line 308, at a first node 312; the other terminal of its primary winding is connected to the neutral line 309 at a second node 313. A winding 315 is wound around a first toroid 316 which surrounds the phase line 308, is connected in series to the first secondary winding 346, and is interposed between a first resistor 314 and a second resistor 317. The second resistor is furthermore connected to the neutral line 309. The first secondary winding 346 of the transformer 311 supplies a low-value voltage (approximately 9 V AC).

The second secondary winding is connected to low-voltage power supply means 318, comprising a rectifier, which supply a low-voltage direct current. A single-pole double-throw (SPDT) switch 319 is interposed between the region affected by the first toroid 316 and the phase receptacle 305 on the phase line 308; said SPDT switch selectively connects the phase receptacle 305 to the phase terminal 302 and to the first secondary winding 346 of the transformer 311 by means of the first resistor 314.

The first toroid 316 is of the type with low magnetic reluctance (forged iron, ferrites, iron-silicon plates, etc.) and is provided with a slot in which a Hall-effect detector 321 is inserted. The detector 321 can be replaced with any device suitable to detect a magnetic field induced in the first toroid 316.

The detector 321 is connected to the inputs of a first amplifier 322 and of a second amplifier 323. The outputs of the amplifiers 322 and 323 are connected respectively to inputs 324 and 325 of a control and indication unit 326. Each one of the inputs 324 and 325 is provided with an analog-digital converter, designated by the reference numerals 348 and 349 respectively.

The control and signalling unit 326 is furthermore connected to a relay controller 328 by means of the output 327. The relay controller 328 is connected to a relay 329 which switches the switch 319. The relay 329 and the relay controller 328 are powered by the phase terminal 302 and by the neutral terminal 304, through a possible resistor 350, as shown, or by the low-voltage power supply means 318. The switch 319 may furthermore be constituted by a semiconductor-based electronic switch.

A second toroid 330 for controlling current dispersion in the load surrounds the phase line 308 and the neutral line 309 and is arranged between the switch 319 and the phase and neutral receptacles 305 and 307. The lines 308 and 309 can induce a magnetic field in the toroid 330. A winding 354 is wound around the second toroid 330 and is connected to a first comparator 331; the output of said comparator is connected to an input 332 of the control and indication unit 326.

A line 333 connects the portion of the phase line 308 interposed between the region affected by the second toroid 330 and the phase receptacle 305 to the portion of the neutral line 309 which is arranged between the neutral terminal 304 and the second toroid 330. A switch 334 and a resistor 335 are arranged on the line 333; the switch 334 is used to force a dispersion of current in the load.

A plug presence sensor 336 is arranged next to the neutral receptacle 307, as described in the embodiment of FIGS. 4-7. Similarly to what has been described previously, the sensor 336 is constituted by a light transmitter element and by a reflected-light receiver element which is suitable to detect the light reflected by a pin inserted in the neutral receptacle 307. The light receiver element is advantageously constituted by a phototransistor which emits a signal indicating that a plug is inserted in the outlet; said signal forms the output signal of the sensor 336. The output of the sensor 336 is connected to a second comparator; the output of said second comparator is connected to an input 338 of the control and indication unit 326.

Outlet polarity detection means 339 are connected in series to the neutral receptacle 307 and to the ground receptacle 306. Furthermore, a resistor 340 is arranged in series with respect to the detection means 339. The outlet polarity detection means 339 are advantageously constituted by a light-emitting diode and by a phototransistor, as described in the embodiment of FIGS. 8-10. Similarly to the previous embodiment, the anode of the diode is connected to the neutral line 309, and its cathode is connected to the ground line 310. A resistor may furthermore arranged in series control with respect to the diode to allow current and to set the sensitivity of the diode. If the neutral voltage is not equal to the ground voltage, the resistor arranged in series with the diode must have such a value as to prevent the emission of light from the diode when it is interposed between the neutral and ground voltages. The phototransistor is arranged so that it can detect the light emitted by the light-emitting diode. The phototransistor is also provided with an adjustment and calibrating resistor connected in series with it. The output of the phototransistor constitutes the output of the outlet polarity detection means 339. Said output is connected, either directly or by means of a comparator (not shown), to the control and indication unit 326 by means of an input 340.

A first 341, a second 342 and a third 343 light-emitting diode are furthermore connected to the unit 326, in a manner so that they can be activated by said unit. The diodes 341-343 conveniently have different colors. A switch 344 is connected between the ground and the control and indication unit.

The control and indication unit 326 is furthermore provided with an output 345 for connection to other control and/or indication units.

A protection fuse 347 is arranged between the phase terminal 302 and the node 312.

Finally, the powering of all the electronic components of the device and the provision of all the reference voltages for the comparators and amplifiers may be obtained from the low-voltage power supply means 318.

Operation of this further embodiment of an outlet according to the present invention is as follows.

The switch 319 initially connects the phase receptacle 305 to the first secondary winding 346 of the transformer 311. By connecting the power supply terminals 302, 303 and 304 to the mains, power is supplied to the transformer 311 and consequently to the power supply means 318, which supply power to all the electronic components at an appropriate voltage which is normally lower than the mains voltage.

If the device is connected to the mains with the correct phase/neutral polarity, the light-emitting diode of the polarity detection means 339 does not conduct enough current to allow light emission. Accordingly, the phototransistor of the polarity detection means detects no light and does not emit an incorrect-connection signal. If no incorrect-connection signal is sent by the polarity detection means 339, the control and indication unit makes the first diode 341 flash, indicating correct connection to the mains.

If instead the device is connected to the mains incorrectly, i.e. if the neutral line 309 is supplied with the phase voltage and the phase line 308 is supplied with the neutral voltage, the light-emitting diode of the polarity detection means 339 starts to conduct, since it is interposed between the phase voltage which is present on the neutral line 309 and the ground line 310. The diode emits light, which is detected by the phototransistor of the polarity detection means 339; said phototransistor generates an incorrect-connection signal which is sent to the control and indication unit 326. The control and indication unit 326 recognizes the incorrect-connection signal and does not make the first diode 341 flash. The absence of light emitted by the diode 341 warns the user of an incorrect connection to the mains.

Once the correct phase/neutral connection to the mains has been established, the device checks whether a plug is inserted in the outlet. The light-emitting element of the sensor 336 emits light toward the inside of the neutral receptacle 307. If a pin is inserted in the receptacle, this light is reflected by said pin. The reflected light is detected by the reflected-light receiver element, for example a phototransistor, which sends a plug presence signal to the comparator 337. The reference voltage of the comparator is set so as to trigger the comparator if a pin is present in the receptacle 307.

The device then checks the load connected to the outlet. The switch 319 supplies the load with a low power, which can be taken from a low-value voltage supplied by the first secondary winding 346 of the transformer 311. The second toroid 330 checks whether there is current dispersion in the load. Since the toroid 330 surrounds the phase line 308 and the neutral line 309, the current present on the phase line 308 must always have the same value as the current present on the neutral line 309, if the load is not defective. The currents present on the two lines are always in mutually opposite directions. If the two currents are equal, the magnetic field induced in the toroid 330 must be zero. If instead there is current dispersion in the load, the current in the neutral line 309 is lower than the current on the phase line 308. The difference in currents induces a magnetic field in the toroid 330, and said field induces a current in its winding. This current is detected by the comparator 337 which, once it has been triggered, sends a current dispersion signal to the control unit. The number of turns of the winding of the toroid 330 and the comparator 337 are both set so as to detect a current dispersion higher than approximately 10 mA. The control and indication unit 326 makes the second diode 342 flash, indicating a defective load.

After the device has checked whether there is current dispersion in the load, it checks whether there is an overload or short-circuit status in the load.

The switch 319 again supplies the load with the low-value voltage provided by the first secondary winding 346 of the transformer 311. If there is a short circuit on the load, all the current supplied by the secondary winding 346 flows through the load. In this manner, no current circulates in the winding 315 of the first toroid 316, since the winding 315 is arranged in parallel to the load. Due to the absence of current in the winding 315, no magnetic field is induced in the first toroid 316. The Hall-effect detector 321 does not detect the presence of the magnetic field and consequently generates no signal. The lack of a signal from the detector 321 is interpreted by the control unit 326, by means of the amplifier 322 and of the A/D converter 348, as a short circuit present in the load, and causes the third diode 343 to flash.

If instead the load is different from a short circuit, the current supplied by the secondary winding 346 is divided between the load and the circuit which comprises the winding 315 of the first toroid 316, since these two elements are connected in parallel. The current present in the winding 315 depends on the values of the resistors 314 and 317 and on the resistance of the load. With a current present in the winding 315, a magnetic field is induced in the toroid 316. The induced magnetic field is detected by the Hall-effect detector 321, which generates a signal which is always proportional to the current of the load. In the period during which a low-value voltage is supplied to the load, only the input 324 connected to the amplifier 322 is active. The amplifier 322 detects the signal sent by the detector 321 and sends it to the input 324 and consequently to the A/D converter 348. The converter converts the analog signals into digital signals which can be read by the control and indication unit 326. The control and indication unit 326 checks whether the current on the load is within the preset limits, i.e. whether there is a short circuit, as has been described earlier, or whether there is an excessively high load current value, indicating the presence of an overload. In case of overload, the control and indication unit makes the third diode 343 flash.

Once the device has established that there are no defects in the load or any current flow that does not match the characteristics of the outlet, said device sends an activation signal to the relay controller 328 by means of the output 327; said controller activates the relay 329. The relay 329 activates the switch 319, which powers the phase receptacle 305 with the mains voltage which arrives from the phase terminal 302. At the same time, the control and indication unit 326 activates the input 325 which is connected to the amplifier 323. The phase line 308 induces a magnetic field which is different from the field induced by the winding 315. The sum of the two magnetic fields always remains proportional to the current of the load. However, since the resulting magnetic field induced in the toroid 316 has a different value, the signal generated by the Hall-effect detector 321 is detected by the amplifier 322, by the input 325 and by the A/D converter 349. The A/D converter 349 sends values which are proportional to the load current to the unit 326, and said unit 326 checks whether the current of the load is still within the preset limits (short circuit/overload). If the unit 326 detects a short circuit or an overload, it sends a deactivation signal to the relay controller 328; said controller, by means of the relay 329, switches the switch 319, again supplying power to the load with the low-value voltage.

By operating the switch 334 by means of a button, a difference in current between the portions of the phase line 308 and of the neutral line 309 which pass through the second toroid 330 is obtained. In this manner a current dispersion is forced, checking the correct operation of the load current dispersion control, signalled by the second diode 342.

Furthermore, by operating the switch 344 the device switches to a forced operation, during which the load is always supplied with mains power, without performing the above described checks. Forced operation is signalled by the control unit 326, which switches on all of the three diodes 341-343.

Practical tests have shown that the electrical distribution device according to the present invention achieves the intended aim and objects, constituting a valid alternative to devices provided with safety switches or to outlets equipped with a fuse, since if no load is connected to an outlet there is no voltage on that particular outlet; furthermore, even if objects different from plugs of loads are inserted, power is not supplied, since a load is not recognized.

The invention thus conceived is susceptible to numerous modifications and variations, all of which are within the scope of the inventive concept.

Finally, all the details may be replaced with other technically equivalent ones.

In practice, the materials employed, as well as the shapes and dimensions, may be any according to the requirements without thereby abandoning the protective scope of the following claims.

I claim:

1. An electrical distribution device, particularly for civil and industrial users, comprising:

a single-phase/multiple-phase electrical distribution line provided with a neutral, a ground and a phase, and at least one electrical connector for data transmission;

a plurality of electrical tapping outlets mutually connected by said electrical distribution line and said electrical connector and suitable to accommodate a plurality of plugs in respective receptacles;

control means connected to said electrical connector, said control means being suitable to control said device; and a local control unit connected to said electrical connector, said local control unit checking the type and the state of the load connected to each of said outlets before powering said outlets, said powering being enabled in case of no short circuits in the loads;

said control means comprising a consumption measurement unit and a management unit for said plurality of outlets, said management unit selecting the powering of essential loads connected to said outlets in case of excessive consumption detected by said consumption measurement unit, before powering said outlets;

each outlet being provided with detection means for detecting said plugs within said respective receptacles, said detection means being suitable to indicate the presence or absence of said plugs to connection means for connecting the outlet to said electrical distribution line, said connection means being adapted to selectively close normally open coupling means between said distribution line and said outlet if a plug within a respective outlet is detected by said detection means; wherein said connection means comprise power supply means which supplies power to a pulse generator which is suitable to transmit, on receptacles of said outlets, a high frequency pulsed low-value voltage to detect the type of the load connected to the outlet, and a detection probe which is arranged on a receptacle and is suitable to detect the type of the load and to report it to said local control unit, said local control unit receiving, in input, a signal arriving from said detection probe, and control signals related to internal local voltage references from a pair of comparators which have inputs connected to receptacles of said outlet and to said internal references, said local control unit being adapted to operate an actuator which activates said coupling means to provide connection of the receptacles of said outlet to said electrical distribution line.

2. A device according to claim 1, further comprising means for detecting the dispersion of the current in the load before powering said outlets.

3. A device according to claim 1, wherein said management unit comprises a memory in which a table of the essential loads is stored.

4. A device according to claim 1, wherein said detection probe is constituted by a Hall-effect probe.

5. A device according to claim 1, wherein said detection means comprises a photodiode which emits an electromagnetic radiation which can be detected by an optical receiver and can be blocked by pins of an electrical plug inserted in said outlet, said optical receiver being suitable to emit a signal indicating the absence of the electromagnetic radiation in the presence of a plug inserted in said outlet.

6. A device according to claim 1, wherein said coupling means comprises first switches for connecting said distribution line to said receptacles and second switches for connection between said pulse generator and said receptacles, said first and second switches being connected or open in a mutually exclusive manner.

7. A device according to claim 1, further comprising polarity detection means associated with the neutral and the ground of said electrical distribution line, said detection means being suitable to generate a correct-connection signal according to the voltage on the neutral and ground of said electrical distribution line.

8. A device according to claim 1, wherein each individual outlet of said plurality of outlets comprises at least one of said receptacles and said detection means for detecting the presence of a pin of the plug in said at least one receptacle, said detection means being associated with means for controlling the electrical power supply of the outlet.

9. A device according to claim 8, wherein said detection means are constituted by a sensor which detects the presence of a pin of the plug in any one of said at least one receptacle.

10. A device according to claim 9, wherein said at least one receptacle is a neutral receptacle.

11. A device according to claim 10, wherein said sensor comprises an element for transmitting electromagnetic radiation and an element for receiving reflected electromagnetic radiation, said transmitter element being suitable to emit an electromagnetic radiation and said receiver element being suitable to detect the electromagnetic radiation reflected by said pin.

12. A device according to claim 11, wherein said electromagnetic radiation is constituted by an infrared radiation.

13. A device according to claim 8, wherein said means for controlling the electrical power supply of the outlet comprise at least one connection switch.

14. A device according to claim 8, wherein said means for controlling the electrical power supply of the outlet comprise a relay which is suitable to activate said at least one connection switch.

15. A device according to claim 8, wherein said means for controlling the electrical power supply of the outlet comprise at least one semiconductor-based electronic switch.

16. A device according to claim 8, wherein said detection means for detecting the presence of a pin and said means for controlling the electrical power supply of the outlet are associated with said local control unit.

17. A device according to claim 8, wherein said means for controlling the electrical power supply of the outlet are activated by said local control unit.

18. A device according to claim 8, wherein said means for controlling the electrical power supply of the outlets comprise a protection fuse.

19. A device according to claim 1, wherein said detection means for detecting the presence of a pin generates a pin presence signal.

20. A device according to claim 1, wherein said detection means comprises a light-emitting diode for indicating the presence of the pin.

21. A device according to claim 15, wherein said diode is activated by said local control unit.

22. A device according to claim 1, wherein each one of said outlets comprises polarity detection means, said polarity detection means being associated with the neutral power supply line and with the ground power supply line and being suitable to generate a correct-connection signal according to the voltage on said neutral and ground power supply lines.

23. A device according to claim 22, wherein said polarity detection means are constituted by an electromagnetic radiation emitter and by an electromagnetic radiation sensor, said emitter being suitable to emit an electromagnetic radiation in accordance with the polarity of the connection of the plug to said electrical distribution line, said electromagnetic radiation sensor being adapted to detect said emitted electromagnetic radiation.

24. A device according to claim 22, wherein said electromagnetic radiation emitter is constituted by a semiconductor-based light emitter.

25. A device according to claim 22, wherein said electromagnetic radiation emitter is constituted by a light-emitting diode.

26. A device according to claim 25, wherein the anode of said diode is connected to said neutral power supply line.

27. A device according to claim 25, wherein the cathode of said diode is connected to said ground power supply line.

28. A device according to claim 22, wherein said electromagnetic radiation sensor is constituted by a semiconductor-based light sensor.

29. A device according to claim 23, wherein said electromagnetic radiation sensor is constituted by a phototransistor.

30. A device according to claim 23, wherein the output signals of said electromagnetic radiation emitter are detected by said local control unit which is suitable to signal the correct connection of said plugs to said electrical distribution line.

31. A device according to claim 30, wherein said local control unit is adapted to activate a light-emitting diode which signals the correct connection of said outlet to said electrical distribution line.

32. A device for detecting and measuring the status of the load, particularly for civil and industrial users, for recognition of the load prior to the supply of power to said load, comprising:

first power supply means for supplying electrical power at the electrical distribution line voltage;

second power supply means for supplying low electrical power;

detection and measuring means for detecting and measuring the type and the state of the load associated with each one of a plurality of outlets connected to the electrical distribution line, said detection and measuring means preventively recognizing said load and the state of the load prior to supplying power to said outlets, said detection and measuring means checking for the presence of an overload or a short-circuit in the load before powering the corresponding outlet; said measuring and detection means comprising means for detecting the dispersion of the current in the load before powering said outlets; and connecting means for connecting the load to said first power supply means in case of positive detection by said detection and measuring means;

said load and said detection and measuring means being powered by said second low-power supply means during the detection of the state of the load, said connecting means being controlled by said detection and measuring means.

33. A device according to claim 32, further comprising control and indication means, wherein said means for detecting the dispersion of the current in the load comprises a toroid with windings connected to said control and indication means, said toroid surrounding phase and neutral lines of the first and second power supply means.

34. A device according to claim 33, wherein said detection and measuring means comprise a winding which is wound around a first toroid, said winding being arranged in parallel to the load and being supplied by said second power supply means, said winding being adapted to induce in said toroid a magnetic field which is proportional to the load current.

35. A device according to claim 34, wherein a power supply line of the first power supply means is associated with said toroid so as to induce in said toroid a magnetic field which is proportional to said load current when the load is powered by said first power supply means.

36. A device according to claim 35, wherein said power supply line is the phase line.

37. A device according to claim 35, wherein said toroid comprises a slot in which a magnetic field sensor is inserted, said sensor being suitable to detect said magnetic field induced in said toroid.

38. A device according to claim 37, wherein said magnetic field sensor is constituted by a Hall-effect sensor.

39. A device according to claim 37, wherein said magnetic field sensor is adapted to generate a signal which is proportional to the current of the load, said signal being detected by said control and indication means.

40. A device according to claim 32, wherein said second power supply means draws power from said first power supply means.

41. A device according to claim 32, further comprising control and indication means, said control and indication means being adapted to control the switching of the power supply of the load from said first power supply means to said second power supply means and to control the switching of the power supply of the load from said second power supply means to said first power supply means, in accordance with the type and the state of the load detected by said detection and measuring means.

42. A device according to claim 41, wherein said control and indication means are suitable to signal the state of the load.

43. A device according to claim 32, wherein said detection and measuring means comprise means for measuring the current of the load which are adapted to measure said current when the load is supplied by said first power supply means, by said second power supply means or by said first and second power supply means.

44. A device according to claim 37, wherein said load connecting means comprises switching means which are suitable to selectively connect the load to the first and second power supply means.

45. A device according to claim 44, further comprising control and indication means, wherein said connecting means comprise means for actuating said switching means, said actuation means being driven by said control and indication means.

46. A device for detecting and measuring the status of the load, particularly for outlets for civil and industrial users, for recognition of the load prior to the supply of power to said load, comprising:

first power supply means for supplying electrical power at the electrical distribution line voltage;

second power supply means for supplying low electrical power;

detection and measuring means for detecting and measuring the type and the state of the load associated with each one of a plurality of outlets connected to the electrical distribution line, said detection and measuring means preventively recognizing said load prior to supplying power to said load;

connecting means for connecting the load to said first power supply means in case of positive detection by said detection and measuring means;

control and indication means; said detection and measuring means for detecting and measuring the type and the state of the load comprising means for detecting the dispersion of the current in the load before powering said load, wherein said means for detecting the dispersion of the current in the load comprises a toroid with windings connected to said control and indication means, said toroid surrounding phase and neutral lines of the first and second power supply means; said load and said detection and measuring means being powered by said second low-power supply means during the detection of the state of the load, said connecting means being controlled by said load status detection and measuring means;

said control and indication means being adapted to control the switching of the power supply of the load from said first power supply means to said second power supply means and to control the switching of the power supply of the load from said second power supply means to said first power supply means, in accordance with the type and the state of the load detected by said detection and measuring means.

47. A method of safely powering at least one load connected to a respective outlet of an electrical system supplied by the electrical distribution line, comprising the steps of:

checking if a plug is inserted in an outlet;

checking the load connected to the outlet for the presence of a current dispersion in the load;

checking the load connected to the outlet for the presence of an overload or short-circuit in the load;

checking the load power consumption to determine if it is within the allowable maximum consumption for the electrical system; and in case of positive checkings, powering the outlet to which the load is connected.

* * * * *